(12) United States Patent
Johnson

(10) Patent No.: US 7,317,988 B2
(45) Date of Patent: Jan. 8, 2008

(54) METHOD FOR AUTOMATICALLY OPTIMIZING THE LEGEND FOR REAL-TIME MAPPING

(75) Inventor: Brett Johnson, Ames, IA (US)

(73) Assignee: Ag Leader Technology, Inc., Ames, IA (US)

( * ) Notice: Subject to any disclaimer, the term of this patent is extended or adjusted under 35 U.S.C. 154(b) by 13 days.

(21) Appl. No.: 11/205,423

(22) Filed: Aug. 17, 2005

(65) Prior Publication Data

US 2007/0043529 A1 Feb. 22, 2007

(51) Int. Cl.
*G06Q 50/00* (2006.01)

(52) U.S. Cl. .............................................. 702/2; 702/5

(58) Field of Classification Search .................... 702/2, 702/3, 4, 5; 701/50
See application file for complete search history.

(56) References Cited

U.S. PATENT DOCUMENTS 5,978,723 A * 11/1999 Hale et al. .................... 701/50
6,016,713 A * 1/2000 Hale ......................... 73/864.45
6,041,582 A * 3/2000 Tiede et al. ............... 56/10.2 A

* cited by examiner

*Primary Examiner*—Donald E McElheny, Jr.
(74) *Attorney, Agent, or Firm*—Kent A. Herink; Emily E. Harris

(57) ABSTRACT

A method is provided for updating a legend of a spatial display for use with graphical user interface of a field computer linked to one or more sensors for sensing data or information from a piece of equipment performing an agricultural operation. The method provides a field computer with a graphical user interface, at least one sensor operatively linked to the field computer, and a piece of equipment performing an agricultural operation and in operative communication with the at least one sensor for sensing data or information for display on the graphical user interface. The method comprises the steps of assigning one or more range values to a legend wherein said range values divide substantially all of the data or information into a plurality of associated ranges; displaying a spatial representation of a geographic location wherein said display is coded to associate the range values with corresponding locations on the spatial representation of a geographic location; and updating the legend based upon a predefined criteria.

15 Claims, 5 Drawing Sheets
(3 of 5 Drawing Sheet(s) Filed in Color)

METHOD FOR AUTOMATICALLY OPTIMIZING THE LEGEND FOR REAL-TIME MAPPING

BACKGROUND OF THE INVENTION

1. Field of the Invention

The present invention relates to a method for updating a legend of a spatial display for use with graphical user interface of a field computer linked to one or more sensors for sensing data or information from a piece of equipment performing an agricultural operation. In particular, to a method for real-time calculation and regeneration of a legend display for a spatial map.

2. Background

Agriculture, like most fields, has been technologically transformed in recent years. The field of precision agriculture is one such area of technological innovation that has produced far-reaching consequences and affects for modern agriculture. Advances in crop management, and in particular, the management of within-field variation creates enormous benefits and challenges for site-specific farming and crop management.

Presently, crop management decisions are typically made on a within-field basis. Entire fields are no longer treated as if they were one homogeneous unit. It has been understood for a long time that soil characteristics (pH, texture, organic matter) and other factors such as moisture conditions or weed problems may vary considerably within a given field. In the past it was not technologically feasible to account and track for such localized variations. This is no longer the case. Instead of managing an entire farm or field based upon some hypothetical average condition, which may not exist anywhere, a precision farming approach recognizes site-specific differences within fields and adjusts management actions accordingly. For example, based on extensive soil testing, different locations within a field may receive different amounts of fertilizer.

Technological advancements make precision farming not only possible, but make it easier. Smaller, faster, less expensive computers are of critical importance in gathering, analyzing, and acting upon information about soils and growing conditions in a timely manner. Soil sensors, variable rate applicators, on-the-go yield monitors, and global positioning systems (GPS) that use satellite technology to identify specific locations within fields are the high-tech tools of the precision farmer.

Harnessing this wealth of technology requires sophisticated data collection and analysis tools, of a type not considered practical or possible a few years ago. Accordingly, prior art methods of collection and analysis of crop management information are antiquated when it comes to meeting the demands of precision farming. Much improvement is required when it comes to managing the wealth of data available in modern farming in order to realize the true potential of precision agriculture.

In particular, present agricultural monitors, such as yield monitors and the like, display on a continuous basis data values received from single or multiple sensors located on an agricultural machine. Systems that can handle instantaneous measured and calculated data values are referred to as real-time monitoring systems.

Systems that have the capability to record data values received from single or multiple sensors on a machine on a continuous basis are referred to as field computers. When a field computer is coupled to a global positioning system, the latitude, longitude, and elevation can be recorded with each data value at the geographic location where the value was measured.

Recorded geographic position can be used to plot a spatial representation of the data in the form of a map for display on the computing device. The map can further convey spatial information by associating a grayscale or color with points on the map, wherein the grayscale or color represents a unique data value spatially associated with a particular geographic point represented on the map. However, when there are many unique values, it becomes impractical assign a unique color to each unique value and furthermore becomes difficult for the user to interpret the information as the number of different colors overwhelms the resolution of the screen displaying the map. Grouping segments of data values into a plurality of ranges, and displaying a unique grayscale or color for all points that fall within a given range is the normal method of dealing with this problem. This reduces the number of colors required to a manageable level, without unreasonably restricting the amount of information that the map can convey.

In order to understand the grayscale/color scheme, mapping systems typically display a legend to describe the data grouping displayed on the map. The legend displays a color indicator along with the corresponding range of values that are associated with that color on the map. In principle, the legend is merely an interpretive aid used to help distinguish the colors used to convey a spatial representation of actual information. In practice, due to the limitations of both the computer systems and the resolution of display screens associated therewith, the legend typically drives how the map is drawn. This is especially true in real-time systems.

For real-time systems data collection and presentation is on going, which requires frequent updating of the screen to reflect new data. Field computers can plot a gray-scale or color map of recorded sensor data, and utilize a legend to assist the user in interpreting the map. When data recording is in progress, the field computer is continuously adding new data to the map. These systems are referred to as "real-time" mapping systems. Present real-time mapping systems do not have the computational power to continuously update the legend data groupings and map to best represent the data. These systems use a legend based on fixed or user-defined ranges, which do not change dynamically during the data collection operation. With this method, the user must either continuously monitor the data map and manually adjust the legend as the data is collected in order to adjust the data groupings to ensure the presentation is meaningful, or ignore the system which will quickly render the data presentation meaningless. Furthermore, frequent adjustments to the legend data groupings require the computer to constantly regenerate the map, which can take a great deal of computational time. In addition, the user is typically operating the equipment at the same time and cannot afford unnecessary distractions.

Thus, a need exists for an improved method for a real-time field computer to monitor the changes in the data and make adjustments to the map legend on a much more intentional, efficient, and predictable basis without input from the user.

SUMMARY OF THE INVENTION

An object of the present invention is to provide a method for updating a legend of a spatial display for use with graphical user interface of a field computer linked to one or more sensors for sensing data or information from a piece of equipment performing an agricultural operation.

These and other objects of the present invention will become apparent to those skilled in the art upon reference to the following specification, drawings, and claims.

The present invention intends to overcome the difficulties encountered heretofore. To that end, a method is provided for updating a legend of a spatial display for use with graphical user interface of a field computer linked to one or more sensors for sensing data or information from a piece of equipment performing an agricultural operation. The method provides a field computer with a graphical user interface, at least one sensor operatively linked to the field computer, and a piece of equipment performing an agricultural operation and in operative communication with the at least one sensor for sensing data or information for display on the graphical user interface. The method comprises the steps of assigning one or more range values to a legend wherein said range values divide substantially all of the data or information into a plurality of associated ranges; displaying a spatial representation of a geographic location wherein said display is coded to associate the range values with corresponding locations on the spatial representation of a geographic location; and updating the legend based upon a predefined criteria.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

In the Figures, is shown a graphical user interface (GUI) for the display of real-time sensor data values, and for displaying a real-time generated map of the sensor data with a corresponding map legend for an agricultural data logging system. In the preferred embodiment of the invention, the system comprises a field computer connected to one or more sensors, which communicate information over a communication bus whereby the sensors send measured sensor values to the field computer that are thereby recorded and a spatial representation is displayed on a display screen of the system. The field computer comprises a graphical user interface that shows information in various functional windows and dialogs and a touch screen is used as the primary method for graphical selection on the display monitor. Also required, is a database or file system to store information that can be retrieved by the interface mechanism and viewed, edited, and manipulated on the display. Those of ordinary skill in the art will appreciate that the invention is not limited to the preferred embodiment. The invention can utilize different components, and is applicable to a variety of applications.

Figure 1:
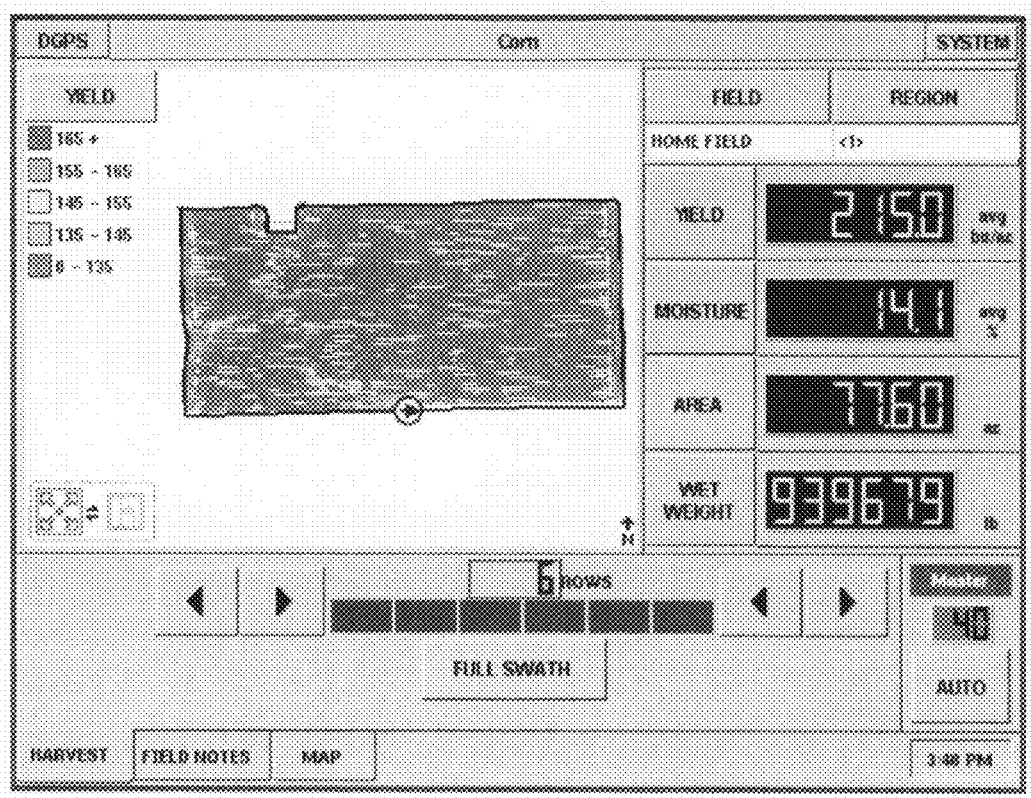
FIG. 1 is a screen shot of a graphical user interface showing a real-time map generated as data values are recorded and a legend that is displayed to describe grouping of data on the map.
Figure 4:
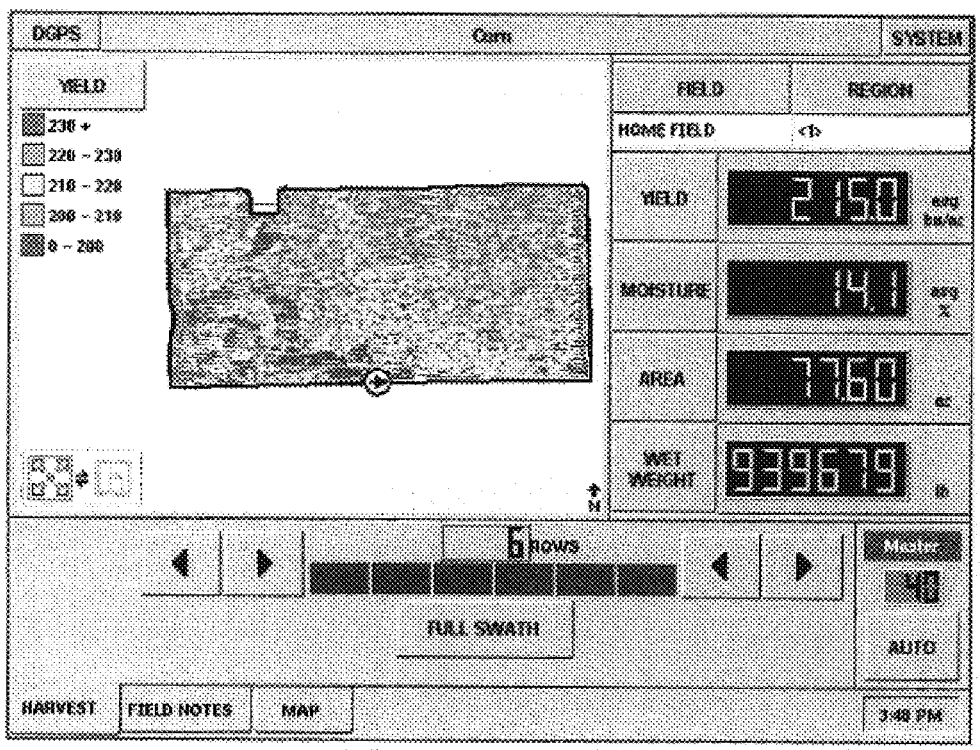
FIG. 4 is a screenshot of the graphical user interface after enabling the automatic legend feature.

The field computer display utilizes a GUI of the type shown in FIGS. 1 and 4. The GUI generally is comprised of three segments: (1) a data view that shows the measured and calculated values in real-time; (2) a plan view spatial map showing details such as yield, moisture levels, or applied rate in a graphical color-coded format; and (3) an area for changing system settings or controlling machine operating parameters.

In more detail, FIG. 1 shows a complete view of the main GUI showing the map legend on the upper left portion of the screen shot, a spatial map in the upper center portion of the screen shot, data display items in the center right portion of the screen shot, and the system and machine controls in the bottom portion of the screen shot. The map legend consists of a plurality Range Values centered about an Average Value, which is the average of the data set. Each Range Value has its own unique color or grayscale associated with it. The map displays the particular Range Value color on the map when the data for the particular attribute being monitored falls within that Range Value. As is described in detail below the number of Range Values and the span of the Range Values can be set manually or by the system. The upper left portion of the screen shows a YIELD button that indicates that the legend and map that is being displayed is the crop yield. Pressing the button located on the upper left portion of the screen shot labeled YIELD, will cycle through all the maps of the attributes that are currently available for mapping. In FIG. 1, at the top of the screen shot a crop CORN is identified. The system also identifies a Field named HOME FIELD, and a Region labeled 1.

The screen shot displayed in FIG. 1 is an example of the field computer display during real-time data collection and mapping. The field computer records at predetermined intervals, and preferably at one-second intervals, so the GUI is also updated each interval to display the most recent information in the data view on the right. The map is also updated at the same frequency to add any new data to the map. A vehicle icon is displayed on the map using GPS to indicate real-time machine position in the field. The position of the icon on the map is also updated on each interval. The GUI update, data recording, a map update interval can be changed to any interval necessary to record and display the pertinent information. The interval can either be predefined in the system, set by the system based on operating parameters, or set by the user.

The map consists of the points that are recorded in a log file in the file system whereby each point is located relative to one another on the screen to represent spatially the geographic location in the field of each recorded data value. The log file stores the data, as it is collected/calculated. Data is retrieved and visually displayed in spatial form on the map located in the center left portion of the display. The Data is also displayed in instantaneous form in the center right data display area. As described in greater detail below, the map points are displayed in a color that is defined by the value of the data and the legend settings define the color ranges. The result of these legend settings is a legend displayed beside the map that provides a color definition of each range of values.

Figure 2:
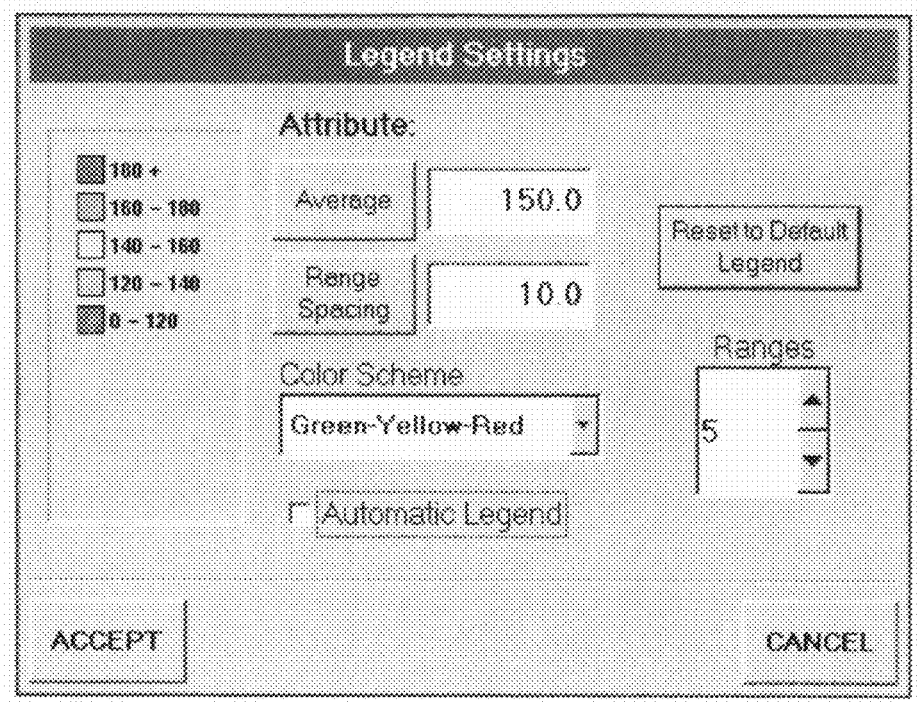
FIG. 2 is a screenshot of the user controls of the graphical user interface for editing the legend with an automatic legend feature disabled.

FIG. 2 shows a screen shot of a legend setting dialog screen that is displayed by touching the display screen anywhere in the area where the legend ranges are displayed. The legend settings dialog consists of a legend preview on the left that is the result of the legend settings as selected on the dialog screen. As described in greater detail below, there is a user-interface check box that toggles the automatic legend on and off. When the automatic legend is off as shown in FIG. 2, the user can edit the legend ranges manually. For a manually generated legend, the user can enter the average value for the legend ranges, the spacing of the ranges, and the number of ranges. The combination of these settings generates the Range Values that will be displayed and associated with a particular color scheme. The color scheme can also be selected from a plurality of user-defined choices by making a selection from the Color Scheme drop down button. Additionally, the user can restore the default legend data grouping by pressing a Reset to Default Legend button. Finally, the user can accept or cancel the changes by selecting the appropriate button. The user is returned to a screen of the type shown in FIG. 1 with the legend and map changes (if any) shown on the screen.

Figure 3:
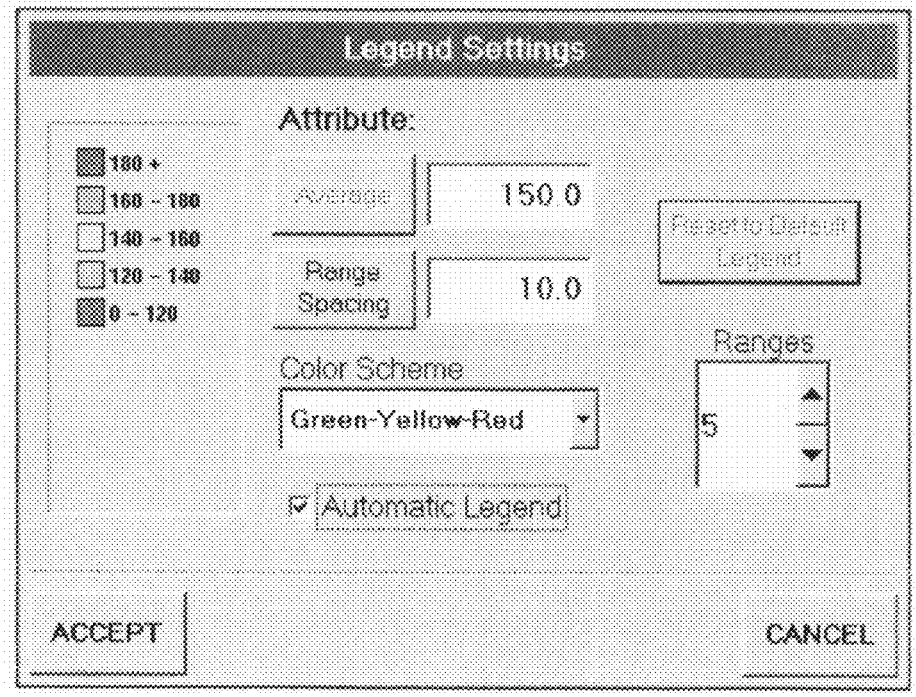
FIG. 3 is a screenshot of the user controls of the graphical user interface for editing the legend with the automatic legend enabled.

FIG. 3 shows a screenshot of the legend settings dialog with the automatic legend feature enabled. When the automatic legend feature is enabled, certain manual legend settings are disabled because the system will calculate these legend values itself. The user can still edit the colors and number of ranges when the automatic legend feature is enabled. Generally, when the automatic legend feature is enabled the system will calculate the range spacing (i.e. the span of the legend groups), however, the user is still allowed to set this feature even when automatic legend feature is enabled.

When the automatic legend feature is enabled, the system immediately determines the average value setting based on the latest data recorded in the field. The legend preview on the left will immediately update to show the optimized legend for the existing data. If there is no existing data, the legend settings will initially use a default legend that has been predetermined by the user or pre-programmed into the system.

Legend color and ranges settings are stored for each crop harvested or product applied in each field, instead of as a single global system setting so that each map generated can have a legend optimized for the crop in that field. The automatic legend enable setting, however, is stored as a global setting so the user only has to turn it on, or off, once.

FIG. 4 shows a screenshot of the main GUI and map just following the automatic legend update and map regeneration. In comparison, FIG. 1 represents the legend and map just prior to the automatic legend update. It can be seen that the legend ranges and maps have changed as a result of a shift of the average value of the data set; however, all of the rest of the data presented on the GUI has remained the same. The map has to be regenerate as a result of the legend update because some of the points have to be redrawn as a different color since the values now fall in a different legend range that utilizes a different color. The system processes the data log file for the relevant field to regenerate the displayed map.

Figure 5:
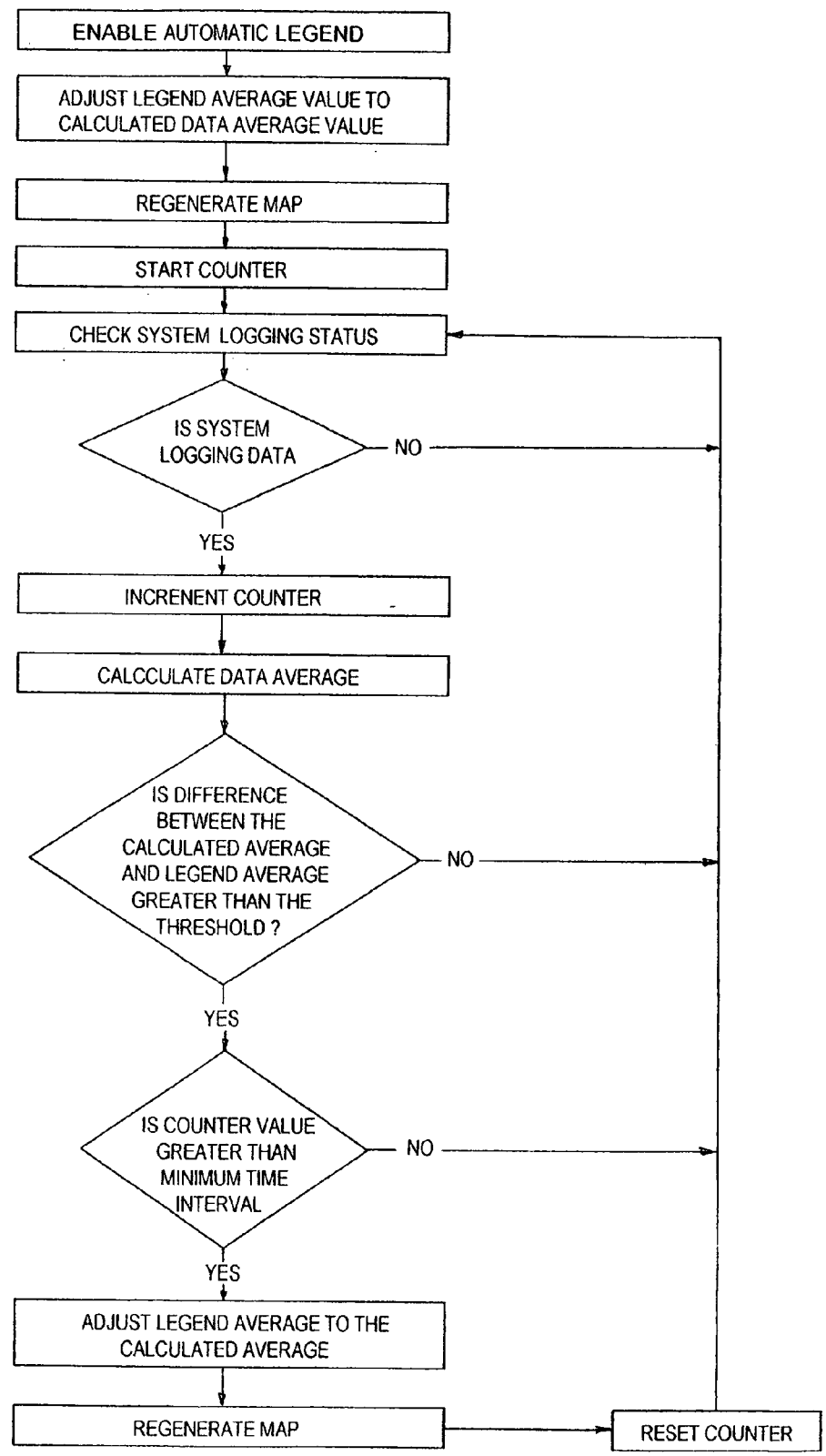
FIG. 5 is a flow chart of the automatic legend process using an average value comparison method in conjunction with a minimum time interval requirement.

FIG. 5 is a flow chart that describes the logic of the present invention. In general, when the automatic legend feature is enabled, the system continuously calculates the average of the data set that is used to generate the map. The system compares the calculated average to the legend average setting. When the calculated average differs from the displayed legend average by more than a predetermined threshold held by the system, and a minimum time interval has elapsed, the system automatically updates the legend and therefore automatically regenerates the map. This method of automatic legend adjustment is called the Average Value Comparison method.

In more detail, when the automatic legend is enabled, the legend is optimized based on the calculated average data value, using the existing map data. When the user returns back to the main GUI, the map is regenerated to the optimized legend. At this point the Average Value Comparison method is used to control the legend adjustment. The Average Value Comparison method is performed by using the following parameters: (1) Average Value Threshold; (2) Minimum Time Interval Threshold; and (3) an internal counter. The system first determines if the system is logging data. If the system is logging data, the Average Value Comparison method begins by incrementing the counter.

The system then calculates the data average based on the most current data available. The calculated average is compared with the current legend average setting to determine if the difference is greater than the Average Value Threshold. If the difference is not larger than the Average Value Threshold, program control returns to the step that determines data logging status. If the difference exceeds the Average Value Threshold, the system then determines if a sufficient time period has elapsed by comparing the counter to the Minimum Time Interval Threshold between screen regenerations. If the counter does not exceed the Minimum Time Interval Threshold, program control returns to the step that determines data logging status. If the counter does exceed the Minimum Time Interval Threshold the system sets the legend average to the calculated average, and regenerates the screen with the new legend setting. The counter is reset and program control passes back to the data logging status.

According to the method shown in FIG. 5 the system periodically calculates the average of the values of the data set that is used to generate the map. When the automatic legend feature is enabled, the system periodically compares the calculated average of the data set to the legend average setting to see if the calculated average exceeds the Average Value Threshold held by the system. This comparison, called the threshold check, is only performed while data recording is active. The threshold check is performed on a time interval that coincides with the data recording interval. In the preferred embodiment of the present invention, the threshold check is performed on a one-second interval, however, it is anticipated that other intervals can and will be used.

The Average Value Comparison method is provided as a method to limit the frequency that the legend is updated. Map regeneration can require several seconds to several minutes to regenerate, depending on the system and the complexity of the data, and frequent updates are distracting to the user because of the length of time it takes to redraws the map on the display. Therefore, the Average Value Comparison method provides a minimum time that is allowed between legend updates, which balances the frequency of map regenerations to ensure an accurate data display but does not overburden the system with unnecessary map regenerations. The Minimum Time Interval Threshold can either be fixed in the system or provided at the user-interface level as a user defined setting. When data logging is started, the system tracks the time elapsed in a counter since data logging began. The counter stops incrementing when the system is not logging. When data logging is active and when the calculated average goes outside the Average Value Threshold held by the system and the Minimum Time Interval Threshold has been met, the system automatically updates the legend and regenerates the map. When the legend and map are updated, the counter is reset and the process is repeated according to the foregoing principles.

FIG. 1 shows a button above the legend that is provided so the user can cycle through multiple attributes being mapped simultaneously. Each attribute has its own map and legend settings and its own Average Value Threshold for the automatic legend. If the automatic legend feature is enabled for one of the attributes, it is enabled for all of them (it is a global setting). If there is more than one attribute being logged simultaneously such as yield and moisture, the automatic legend function performs a threshold check on each attribute every second. If any one of the attribute average values falls outside the Average Value Threshold range, then all legends are updated and all maps are regenerated, provided that the Minimum Time Interval is also exceeded.

When the system performs an automatic legend adjustment, the average value of the legend is adjusted to the average of the data set and the legend settings are saved for the particular attribute whose legend has changed. Changing the average value setting will shift all of the Range Values up or down by an amount equal to the change in the average value setting. The spacing value remains constant except in the case where one or more ranges goes below zero after the average is adjusted. In that case, the spacing is automatically adjusted to set zero as the lower limit of the bottom range.

The actual method of calculating the average value and setting the Range Values used during automatic legend optimization can be performed in several other ways. In general, the present invention allows any statistical method to be used to separate the values of a data set into groups that are then used to determine the Range Values of the legend.

For example, the average value can simply be the mean of the data set, the median, or any other similar statistically meaningful calculation. Also, the Range Values can be defined by grouping the data set into equal amounts of points in each range, producing a set number of ranges. The number of Range Values and the spacing could be determined by the standard deviation of the data set, whereby the number of ranges is determined by how tightly grouped the data points are. The maximum number of ranges would be determined by using a minimum spacing threshold setting either set by the user or held fixed by the system.

Another method of determining the number and spacing of the Range Values could comprise using a natural breaks algorithm, sometimes called data clustering. In this method the Range Values are determined such that the data points within each Range Value have minimal deviation from the mean of the data points falling within each Range Value. This is accomplished by first dividing the data into a predetermined number of segments, each having an equal number of data points in each segment. The number of segments would correspond with the number of Range Values set by the user or the system. Then, each segment is checked to determine if moving the boundaries of the segment would reduce the total error within the segment. The total error is defined as the sum of the differences between the mean of the segment and each data point within the segment. The boundaries are tested in this fashion by moving them up and/or down and calculating the total error. The segments boundaries are set at the values that minimize the total error.

Figure 6:
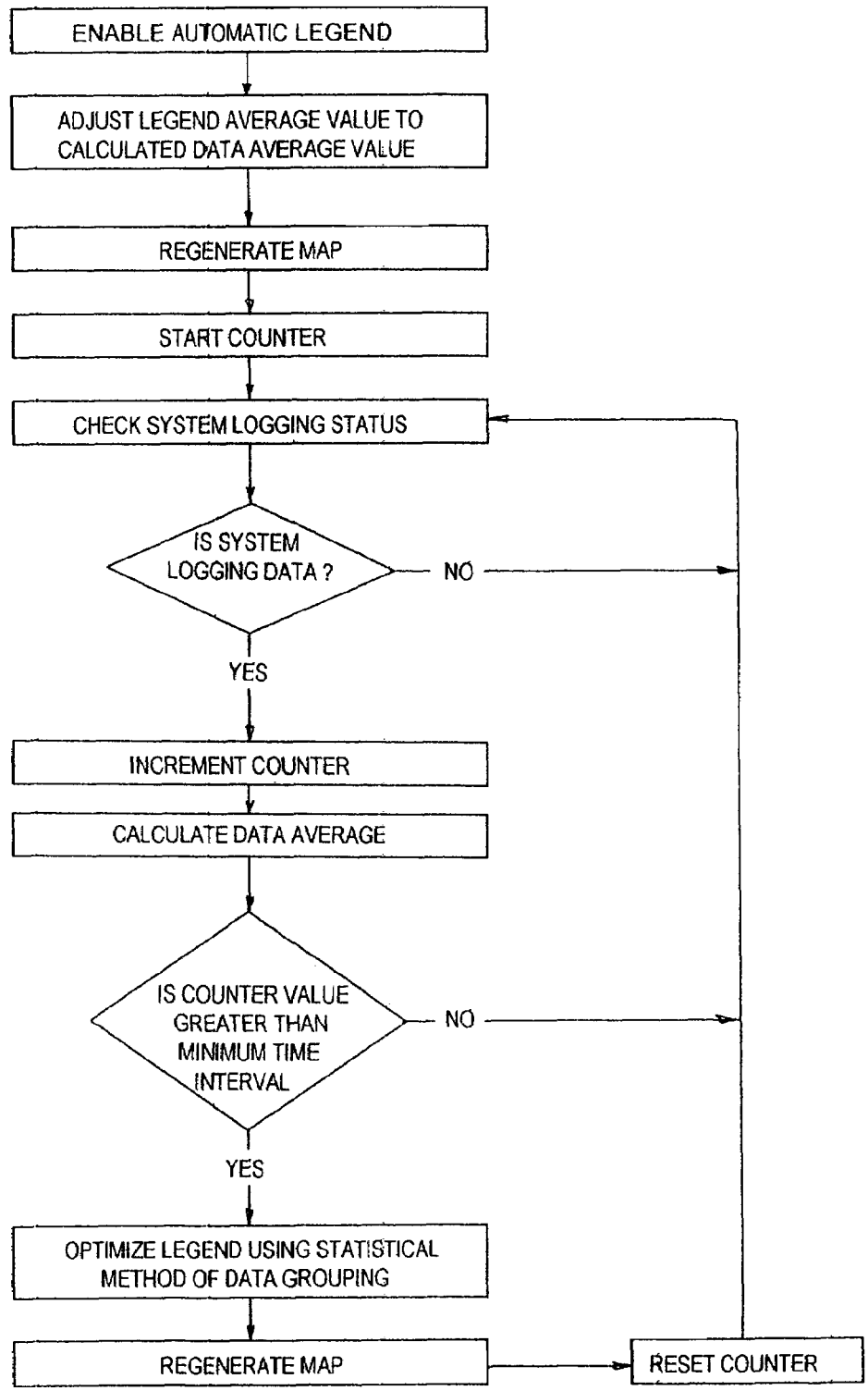
FIG. 6 is a flow chart of the automatic legend process using a simplified method of the minimum time interval requirement.

FIG. 6 is a flow chart of an alternate and simplified method of periodically optimizing legend for a real-time map. This method is based on automatically updating the legend at a specified time interval, without consideration of the Average Value Threshold. For example, the legend routinely optimizes itself and updates the map every 60 seconds in the preferred embodiment. Of course, other intervals can and will be used. Or the threshold could be solely based on the accumulation of a specific value in the data set that is directly measure by a sensor or calculated based on any number of parameters. For example, if the system is recording area covered the system could update the legend every 2 acres covered.

In general, the present invention provides a system including an agricultural field computer having a display capable of generating color or gray-scale maps of recorded attributes whose values are recorded from machine-mounted sensors connected to the field computer over a communication bus. Any field computer that records sensor-measured or calculated attributes and has a real-time map generated during data recording can potentially benefit from automatically optimized legend and map.

The present invention is not limited to any particular statistical method of updating/calculating the Range Values, except to the extent disclosed herein and that the map regeneration be periodic and real-time in nature. In particular, as disclosed herein the Range Values can be calculated based on a calculated average of the data, or upon any number of other statistical methods. As noted other methods of selecting the Range Value can include using the standard deviation of the data, and using the natural breaks method. Other methods include using a minimum data value to set a lower Range Value that would then shift the range values up or down based on any change in the minimum data value. A similar procedure could be used with a maximum data value. Alternatively, the maximum and minimum data values could both be used to set the upper and lower Range Value limits, wherein the Range Values would be segmented therebetween. Still another method of setting the Range Values would be to distribute the data values uniformly between a set or fixed number of range groups. For example, each group would have the same number of data values therein.

A still further method comprises rounding the average value of the data set up or down appropriately to create Range Values that fall on user-defined range breaks. For example, the user may prefer to see the Range Values for a harvest yield map for corn to be even multiples of 10 bushels/acre increments. A user-interface setting would allow the user to define the multiple. The system would take the average yield value and round it to the nearest number divisible by the multiple to set the limits of each range. In particular, assume the user enters 10 (bushel/ac) for the multiple. If the average yield is 156.5 (bushel/ac) the system would round the average yield to 160 (bushel/acre). The legend would then center on the average yield of 160 (bushel/ac). When the number of Range Values is set to four, the Range Values would be 0-150, 150-160, 160-170 and 170+. When the number of Range Values is set to five, the Range Values would be 0-145, 145-155, 155-165, 165-175, 175+. In any case, the legend is centered on the rounded average yield.

Of course, those of ordinary skill in the art will understand that there are a myriad of statistical methods that can be used to determine the Range Values and that the present invention can and will vary in this regard without departing from the scope of the invention.

Furthermore, while the Average Threshold Value and the variations disclosed herein can be used to determine when to regenerate the map, as disclosed in reference to FIG. 6 the invention is not so limited. Other methods are contemplated, such as regenerating based on elapsed time, based on distance traveled, are based on any other parameter that is monitored.

A method is provided to optimize the legend for a recorded attribute using one or more thresholds predefined by the system or through user-defined threshold settings. These thresholds control the behavior of the automatic legend and define when the legend should be updated. A threshold can be solely time-based or based on an accumulation of measured parameters such a distance, area, volume or weight. A threshold can also be a combination of time-based and measured parameters. For example, the legend can be optimized at a 60 second interval, or every 100 meters of travel, or the combination of every 60 seconds if the vehicle has traveled 100 meters.

A method is provided to perform a statistical calculation of a mapped attribute, such as the average of all the data values included on the map or in the log file. The statistical method can be defined by the system or user-defined. In this method, the system stores the result of the statistical calculation while maintaining the same legend. Each time a new data value is recorded and added to the map, the system repeats the statistical calculation on the data set that includes the new data value. The system then monitors the difference between the two statistical calculations to determine whether the legend should be updated and the map regenerated on a periodic basis.

When the time interval between legend optimizations becomes sufficiently short, the legend is effectively changing continuously and the map is continuously regenerated (redrawn) in accordance to the new ranges of the legend. When this behavior is not desired, a method to prevent excessive map regeneration is provided when the changes in the legend are sufficiently small.

A method is provided to prevent the legend from automatically updating while the system is not actively recording data.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

The invention claimed is:

1. A method for updating a legend of a spatial display for use with graphical user interface of a field computer linked to one or more sensors for sensing data or information from a piece of equipment performing an agricultural operation, said method comprising:
   a) providing a field computer with a graphical user interface;
   b) providing at least one sensor operatively linked to said field computer;
   c) providing a piece of equipment performing an agricultural operation and in operative communication with said at least one sensor for sensing data or information for display on said graphical user interface;
   d) performing a statistical calculation on said data;
   e) assigning one or more range values to a legend wherein said range values are based on said statistical calculation;
   f) displaying a spatial representation of a geographic location wherein said display is coded to associate said range values with corresponding locations on said spatial representation of a geographic location; and
   g) updating said range values of said legend based upon a predefined criteria.

2. The method in accordance with claim 1 wherein said predefined criteria comprises the passage of a predefined time interval.

3. The method in accordance with claim 2 wherein said predefined time interval is one minute.

4. The method in accordance with claim 1 wherein said predefined criteria is comprised of comparing said statistical calculation with an updated statistical calculation and comparing a difference to a predefined threshold value.

5. The method in accordance with claim 1 wherein said updating step is selectively enabled and disabled.

6. The method in accordance with claim 1 further comprising the step of obtaining global positioning information for said piece of equipment and said spatial representation utilized said global positioning information.

7. A method for updating a legend of a spatial display for use with graphical user interface of a field computer linked to one or more sensors for sensing data or information from a piece of equipment performing an agricultural operation, said method comprising:
   a) providing a field computer with a graphical user interface;
   b) providing at least one sensor operatively linked to said field computer;
   c) providing a piece of equipment performing an agricultural operation and in operative communication with said at least one sensor for sensing data or information for display on said graphical user interface;
   d) assigning one or more range values to a legend wherein said range values divide substantially all of the data or information into a plurality of associated ranges;
   e) displaying a spatial representation of a geographic location wherein said display is coded to associate said range values with corresponding locations on said spatial representation of a geographic location; and
   f) updating said legend based upon a predefined criteria.

8. The method in accordance with claim 7 wherein said legend is updated periodically.

9. The method in accordance with claim 1 wherein said statistical calculation is an average value threshold calculation which is utilized in said predefined criteria.

10. The method in accordance with claim 1 wherein said statistical calculation is a minimal deviation calculation which is utilized in said predefined criteria.

11. The method in accordance with claim 1 wherein said statistical calculation is a minimal breaks calculation which is utilized in said predefined criteria.

12. The method in accordance with claim 1 wherein said statistical calculation is a standard deviation calculation which is utilized in said predefined criteria.

13. The method in accordance with claim 1 wherein said statistical calculation is a minimal data calculation which is utilized in said predefined criteria.

14. The method in accordance with claim 1 wherein said statistical calculation is a maximum data calculation which is utilized in said predefined criteria.

15. The method in accordance with claim 1 wherein said statistical calculation is a minimal and a maximum data calculation which is utilized in said predefined criteria.

* * * * *